M. H. FRANZEN.
STRAINER FOR COFFEE AND TEA POTS.
APPLICATION FILED APR. 15, 1908.
917,281.
Patented Apr. 6, 1909.
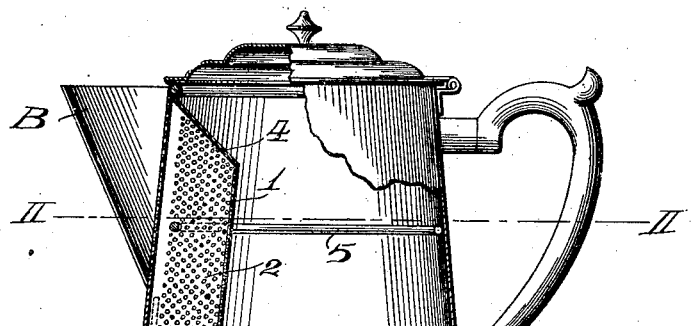
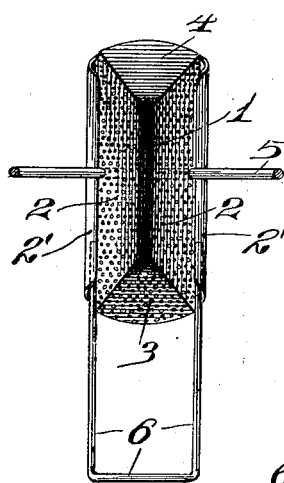
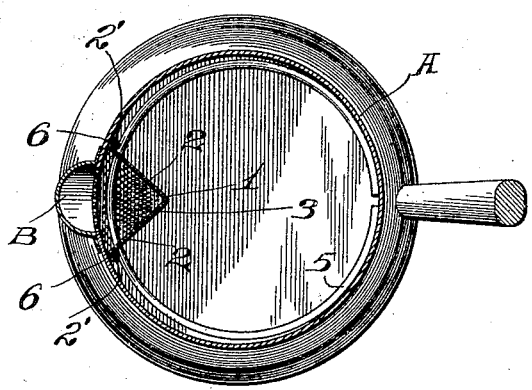
Attest.
H. G. Fletcher.
W. H. Scott.
Inventor:
Magretha H. Franzen.
By G. W. F. Knight
atty.

UNITED STATES PATENT OFFICE.

MAGRETHA H. FRANZEN, OF GOLDEN, ILLINOIS.

STRAINER FOR COFFEE AND TEA POTS.

No. 917,281.  Specification of Letters Patent.  Patented April 6, 1909.

Application filed April 15, 1908. Serial No. 427,175.

*To all whom it may concern:*

Be it known that I, MAGRETHA H. FRANZEN, a citizen of the United States of America, residing at Golden, in the county of Adams and State of Illinois, have invented certain new and useful Improvements in Strainers for Coffee and Tea Pots, of which the following is a full, clear, and exact description, reference being had to the accompanying drawing, forming part of this specification.

My invention relates to a strainer adapted to be removably mounted in a coffee or tea pot, and which is so constructed as to be equally adaptable to a coffee or tea pot, notwithstanding the fact that the spouts of coffee pots are ordinarily placed near the top of the pots, while the spouts of tea pots are ordinarily placed near the bottom of the pots.

Figure I is a vertical section through a coffee pot with my strainer in position therein. Fig. II is a horizontal section taken on line II—II, Fig. I. Fig. III is an elevation of the strainer.

In the accompanying drawings: A designates a coffee pot provided with the usual spout B, located at the top thereof.

1 designates my strainer which is of an elongated V or trough shape in cross section and comprises angular perforated side walls 2, converging toward each other from their free edges, a perforated bottom 3 extending from its free edge at an upwardly incline to the edges of the side walls and the point at which the side walls merge into each other, and a downwardly inclined top 4, preferably imperforate, extending from its free edge to the point at which the side walls merge. The entire strainer 1, with the exception of the top 4, may be constructed of perforated metal or wire cloth, and the inclined bottom and top of the strainer serve to unite the side walls 1. The top 4 is preferably imperforate in order that it may receive names or other marks it may be desirable to apply to the strainer.

5 designates a horizontally arranged cut plain retaining ring which is made of spring wire and passes through the side walls of the strainer. This retaining ring is made of such size as will cause it to fit snugly within the pot in which the strainer is used to hold said strainer against the wall of the pot at the location of its spout, whether it be one used for producing coffee or tea as a drink, notwithstanding difference in the location of the spouts of the different pots.

6 designates an adjustable support by which the strainer may be upheld at any desired elevation in the tea or coffee pot according to the location of its spout. This support consists of a piece of wire bent into U-shape and having its arms slidably fitted in curled beads 2' located at the edges of the side walls 2. The support may be readily drawn outwardly relative to the strainer until it is sufficiently withdrawn to provide for the proper support of the strainer when in use in a tea or coffee pot. When the strainer is not in use the support may be compactly fitted in the strainer.

The hereinbefore described strainer being made with the angular side walls and bottom, is of such shape that it affords a large expanse of straining surface and is furthermore of such shape that the grounds of coffee or tea cannot adhere to the straining surfaces to crowd the perforations therein, but will be constantly washed from such surfaces each time that the pot to which the strainer is applied is tilted to pour liquid therefrom.

It will be seen that the retaining ring 5 being cut so that it may be readily detached from the strainer or connected to the strainer, and that therefore the cleansing of the strainer may be facilitated, and it will be further seen that, due to the parts being detachable from each other, the different parts may be readily packed for shipment and sale.

I claim:

1. A strainer of the character described of elongated V-shape and comprising perforated side walls arranged at angles to each other, a perforated bottom connecting said side walls, and a horizontally arranged cut plain retaining ring detachably passed transversely through the body of said strainer, substantially as set forth.

2. A strainer of the character described of elongated shape and comprising perforated walls arranged at angles to each other, a horizontally arranged cut retaining ring, and a support adjustably fitted to said walls, substantially as set forth.

3. A strainer of the character described of elongated shape and comprising perforated walls arranged at angles to each other, a horizontally arranged cut retaining ring, and a U-shaped support slidably fitted to said walls, substantially as set forth.

4. A strainer of the character described of elongated shape and comprising perforated walls arranged at angles to each other and provided with beads located at their edges, a horizontally arranged cut retaining ring, and a support adjustably fitted to said beads, substantially as set forth.

5. A strainer of the character described of elongated shape and comprising perforated walls arranged at angles to each other and provided with beads located at their edges, and a U-shaped support having arms adjustably fitted in said beads, substantially as set forth.

MAGRETHA H. FRANZEN.

In the presence of—
F. E. SAHLAND,
J. J. EMMINGA.